United States Patent [19]

Eisenhardt, Jr. et al.

[11] Patent Number: 4,477,481

[45] Date of Patent: Oct. 16, 1984

[54] METHOD FOR PRODUCING DRIED CITRUS PULP

[75] Inventors: William A. Eisenhardt, Jr., Worthington, Ohio; Fouad Z. Saleeb, Pleasantville, N.Y.; Randal P. McKay, Paramus, N.J.; Bary L. Zeller, Pleasantville, N.Y.

[73] Assignee: General Foods Corporation, White Plains, N.Y.

[21] Appl. No.: 391,783

[22] Filed: Jun. 24, 1982

[51] Int. Cl.$^3$ ............................ A23L 2/00; A23B 7/02
[52] U.S. Cl. ..................................... 426/590; 426/385; 426/616
[58] Field of Search ............... 426/590, 591, 599, 384, 426/385, 444, 442, 616, 640

[56] References Cited

U.S. PATENT DOCUMENTS

| | | | |
|---|---|---|---|
| 2,567,038 | 9/1951 | Stevens et al. | 426/599 |
| 2,834,687 | 5/1958 | Swisher | 426/599 |
| 3,365,310 | 1/1968 | Webster | 99/204 |
| 3,446,625 | 5/1969 | Blethen | 99/105 |
| 3,723,133 | 3/1973 | Berry et al. | 99/105 |
| 3,931,433 | 1/1976 | Eskritt et al. | 426/599 |
| 4,104,414 | 8/1978 | Rahman et al. | 426/599 |
| 4,187,326 | 2/1980 | Serafino et al. | 426/590 |

OTHER PUBLICATIONS

Kesterson, J. W. et al., "Processing and Potential Uses for Dried Juice Sacs", *Food Technology*, Feb. 1973, pp. 50-54.

*Primary Examiner*—Raymond Jones
*Assistant Examiner*—Elizabeth C. Weimar
*Attorney, Agent, or Firm*—Thomas R. Savoie; Daniel J. Donovan; Joseph T. Harcarik

[57] ABSTRACT

Fresh citrus pulp is water washed and/or combined with an inorganic basic material such as calcium oxide in order to raise the pH of the pulp material to about 4.0 or above. The pH-adjusted pulp is then frozen and freeze-dried resulting in a dry pulp material which has good wetting and dispersion characteristics and a natural appearance in aqueous medium.

8 Claims, No Drawings

METHOD FOR PRODUCING DRIED CITRUS PULP

BACKGROUND OF THE INVENTION

It has long been recognized that the pulp content of natural citrus beverages such as orange juice, is an important contributor to the appearance and mouthfeel of the beverage. The art has long sought a dried pulp-like component which could be added to citrus-flavored beverages, such as those pepared for powdered soft drink mixes, to provide an appearance and mouthfeel which closely resembles that of fresh natural pulp.

Although there is an ample supply of citrus pulp, especially orange and lemon pulp, and there have been prior processes disclosed for producing dehydrated cellular citrus material, such as in U.S. Pat. No. 3,365,310 to Webster, the use of dried natural citrus pulp as an additive to a powdered foodstuff, designed to be reconstituted in water, has not proven satisfactory. It has been found that the dried natural pulp of the prior art does not satisfactorily reconstitute when placed in water and does not provide, when used in a citrus-flavored beverage, a pulp that is acceptable as regards appearance and mouthfeel. These dried pulps have also been found to be excessively friable and also tend to clump and sink when dispersed in water. It has further been found that even freeze drying of untreated pulp does not result in dried material which is suitable for use in powdered beverages mixes as the layer of pulp material collapses during the freeze drying cycle.

In light of the problems with dried natural citrus pulp there have been attempts to produce synthetic pulp material; however, most of these materials have proven to have an excessively mushy or slimy consistency which detracts from their acceptability. Further, most of the synthetic pulp previously produced was not capable of being produced in a dry particulate form which is capable of rapid hydration. U.S. Pat. No. 3,446,625 to Belthen discloses the production of a synthetic pulp which claims to overcome the problems of the prior art. According to one embodiment of this patent, a synthetic pulp product is produced by co-precipitating a water soluble gum (e.g. sodium alginate) insolubilized by calcium and/or potassium cations and a cold-water insoluble or cold-water soluble gum (e.g. locust bean gum). However, for purposes of product labeling and to satisfy the desire of many consumers to consume natural products as well as to avoid the processing and/or cost involved with the production of a synthetic pulp, it would be desirable to obtain a highly functional dried citrus pulp using natural citrus pulp as the starting material.

SUMMARY OF THE INVENTION

The present invention is directed to a method for freeze drying citrus pulp to yield a dry pulp which is readily rehydratable, quickly becomes transparent in solution, has a desirably low density and is both less hygroscopic and more readily ground than conventional freeze dried pulp. According to the present invention, commercially-available wet citrus pulp having a solids concentration of from about 4% by weight to about 12% by weight, typically about 10% by weight and a pH of from about 2.5 to 3.7 (typically 2.7 for lime and lemon, 3.6 for grapefruit and 3.7 for orange) is processed so that the pH of the pulp is increased to at least about 4.0 and the pulp is then frozen, and freeze dried to a moisture content of less than 10% by weight, preferably less than 5%. The dried pulp may then be comminuted to a desired particle size such as by grinding and/or screening. The pH of the pulp may be adjusted by means of a washing step and/or via the addition of an edible, water-soluble, inorganic base which contains a monovalent or divalent cation.

As used in this invention the starting citrus pulp material may be either fresh pulp or frozen and thawed pulp which has been removed from a citrus juice by means such as centrifugation or filtration. The pulp material will contain about 10% solids, which solids consist of about 40% pulp solids and about 60% juice solids (e.g. citric acid, sugars etc). The pulp used in this invention is a by-product of commercial citrus juice manufacturing and has been principally used as an animal feed component. The pulp which has been referred to by a variety of terms including "juice vesicles," "juice sacs," or "finisher pulp" is the material removed from the juice via screening subsequent to the removal of larger materials such as peel and seeds. The pulp essentially consists of the membranes forming the juice sacs and is the material which floats on the surface of freshly-squeezed citrus juices. During juicing operations, juice sacs rupture and release their juice and in commercial operations these sacs are removed (via screening) as a pulp prior to concentrating the juice.

According to one embodiment of this invention, the pH of the citrus pulp material is elevated to 4.0 or above by means of an extensive water washing. Water washing will remove from the pulp the citric acid and sugars which are present. Washing may be conducted in either a continuous or batch manner using a total of at least 3 volumes of wash water per volume of pulp. As will be appreciated by those skilled in the art, the amount of washing will depend on the efficiency of the washing technique employed. It has been found that for low pH pulp such as lemon and lime pulp; a slurry wash with at least seven volumes of water will be preferred; whereas for grapefruit and orange pulp a slurry wash with five volumes of water will be satisfactory. Alternatively, the pH of the pulp may be elevated by addition of one or more monovalent or divalent metal cations. Any edible potassium, sodium or calcium basic compound may be employed; however, it is preferred that a metal oxide, hydroxide, or carbonate be employed to avoid the formation of undesirable salts. The preferred metal ion for use in this invention is calcium.

It would, of course, be possible, and is often desirable, especially with lemon and lime pulp, to combine an initial washing step with the subsequent addition of an inorganic base. Typically, washing could be employed to elevate the pH of lemon or lime pulp to at or below about 3.0 and then further raising the pH to about 4.0 or above by addition of the inorganic base. Four or less volumes of wash water will normally be used to effect the initial pH change. Potassium or calcium oxide or hydroxide will preferably be used to raise the pH of the pulp above 4.0. Pulp obtained in this manner has been found to be less friable than pulp obtained from a process wherein the pH adjustment is solely by means of added inorganic base. Strength of the dried pulp particles can be of concern when the particles must be mixed with other dry ingredients.

It has also been found that when no washing is employed, it is preferable to use a combination of a monovalent and divalent cation to raise the pH of the pulp above 4.0. The use of calcium oxide alone has resulted in a freeze-dried pulp that, while highly acceptable, is more fragile at low moistures (below 5%) than a pulp obtained using both calcium oxide and potassium hydroxide.

It has been found that the pH of the pulp should not be raised above about 5.5 if a white color is desired in the dry pulp product. At pH's above 5.5, the dried pulp will tend to posses a darkened, somewhat brownish color. While a darkened color may be acceptable, or even preferred for producing or simulating a dried orange pulp, usually a white color will be desirable for dried lemon, lime or grapefruit pulp.

It may be desirable to add a small amount of a gum, such as gum arabic or hydroxypropyl cellulose, to the pulp material prior to the drying step for the purpose of improving the wetting characteristics of the dried pulp. Amounts of gum from about 0.1 to 4% by weight of wet pulp are contemplated.

Low DE (less than 20) dextrins can be added to the pulp material prior to drying in order to obtain a desired bulk density in the dried pulp material. Dextrins in the amount of from 0.5 to 20% by weight of the wet pulp are contemplated, with levels of 1 to 5% being preferred.

Freeze drying is an essential step of the process of this invention. Drum drying, foam mat drying and the like do not produce pulp having the desired color, shape, wetability and strength. According to this invention, freeze drying should be accomplished by first chilling the treated pulp to a temperature below about −20° C., preferably below about −30° C. During freeze drying the pulp should be kept under sufficient vacuum to preclude any melt-back. The wet pulp, or preferably an aqueous mix or dispersion of the wet pulp, will typically be put into a shallow tray for freeze drying. The dry material, which will appear as a straw-like mat, will be broken up, ground or otherwise comminuted into flake-like particles which may be blended with a powdered drink mix.

The freeze dried pulp particles produced in accordance with this invention have low hygroscopicity and a natural appearance. The particles readily disperse on the surface of an aqueous medium in a manner similar to the pulp material contained in fresh squeezed citrus juice; this contrasts to present commercially-available dried pulp which tend to form clumps of particles which sink in an aqueous fluid. The pulp particles of this invention hydrate uniformly and turn translucent such that the particles are percieved as possessing the color of the solution on which they are dispersed. The dried particles are of low-density and, as such, will typically be employed in a beverage at a level of from 0.02 to 1.0, preferably 0.03 to 0.5 grams per quart. Due to the presence of juice solids on unwashed pulp, it should be recognized that the weight of unwashed pulp needed to achieve a particular appearance will be greater than the weight of washed pulp needed to achieve the same appearance. In the production of powdered soft drink mixes, the pulp would normally be present at a level of about 0.2-8% for sugar sweetened mixes and about 2-20% for mixes sweetened with an intensive sweetener such as aspartame or saccharin.

DESCRIPTION OF PREFERRED EMBODIMENTS

EXAMPLE 1

Frozen lemon pulp (200 g), was thawed and combined with 1.5 g of calcium oxide (dispersed in 50 ml of water) by mixing for five minutes. The resulting pH was 5.5. One-gram of medium molecular weight hydroxypropyl cellulose (Klucel-GF, available from Hercules, Inc., Wilmington, Del.) dissolved in 50 ml of water was then added and mixed for 10 minutes. Thereafter 10 grams of 15 DE dextrin dissolved in 100 ml of water was added and mixed. The mixture was then frozen in a tray with liquid nitrogen and vacuum freeze dried at less than 250 microns, using a shelf temperature profile of −20° C. for 20 hours, −15° C. for 8 hours and up to ambient temperature over a weekend period. The resulting slab of dried pulp was readily broken up and found to rehydrate quickly with a majority of the particles becoming transparent within 15 minutes.

EXAMPLE 2

Four hundred grams of frozen, fresh lemon pulp was mixed with 4.45 grams of calcium oxide and twenty grams of 15DE dextrin. The pH of the resulting mix was measured as 5.25. The mixture was placed in trays, frozen by liquid nitrogen and freeze dried over a 24-hour period, during which time the shelf temperature was raised to 25° C. while maintaining a vacuum of 50 microns. The resulting mass of dried pulp broke up very easily, and the particles rehydrated quickly and became transparent in a few minutes.

EXAMPLE 3

A 200 gram sample of frozen lemon pulp was thawed and found to have a pH of 2.66. The sample was washed in 200 ml of water and filtered and then washed and filtered again in the same manner resulting in 71 grams of pulp having a pH of 2.81. The pulp was combined in sequence with 100 ml of water, 0.15 grams of calcium oxide suspended in 3 ml of water, and 28 ml of water. The resulting mixture which had a pH of 5.5 was frozen and freeze dried as in Example 1, except that the shelf temperature was held at ambient for only 20 hrs. The resulting dried pulp was readily broken up, was very white and free flowing and went into solution easily.

EXAMPLE 4

One thousand grams of frozen, fresh orange pulp is thawed and mixed with 1000 g of water (pH measured as 3.73) followed by filtering on filter paper. The pulp mass is again mixed with 1000 g of water (the pH at this point in the process was measured as 3.90) and then 39.7 ml of a calcium oxide suspension (2 g CaO per 50 ml of water) was added thereby raising the pH to 5.5. The aqueous mixture is again filtered, placed in trays and frozen, freeze dried and broken up as in Example 1. When the dried pulp was dispersed in water it quickly had the appearance and mouthfeel of fresh pulp.

EXAMPLE 5

1950 lbs (884.5 kg) of frozen lemon pulp was thawed and 19.03 lbs of CaO was added to raise the pH to 5.0. The mix was frozen (−20° F.) and freeze dried (12-14 hours). The dried pulp particles exhibited good wetting and dispersion characteristics and its appearance in aqueous mediums closely resembled the color, shape and size of unprocessed (frozen but never dried) pulp in solution.

EXAMPLE 6

Fresh lemon pulp was water washed in a batch process resulting in a pulp having a pH of 2.80. This pulp was then frozen, stored for several days and fifty pounds (22.68 kg) of the frozen pulp was thawed and again washed with water in a batch process thereby bringing the pulp to a pH of 2.91. The washed pulp was then combined with 2.25 pounds (1.02 kg) of a dilute CaO suspension (3.85% CaO by weight) which raised the pH of the pulp to 4.0. The pulp was then frozen at −30° C., freeze-dried over an 18–22 hour period at a vacuum of less than 250 microns and then broken up. The shelf temperature profile during the freeze-drying cycle was 37.8° C. for three hours, with the temperature modulated down to 29.4° C. during the next three hours and maintained at this temperature for the remainder of the cycle. The resulting pulp had a realistic natural-pulp appearance in aqueous mediums and exhibited good wetting and dispersion characteristics.

Having thus described the invention, what is claimed is:

1. A method for preparing a dry citrus pulp material comprising the step of raising the pH of the wet pulp material to a pH of at least 4.0, said pH being increased by the addition of a water-soluble, edible, inorganic basic material and thereafter freeze drying the pH-adjusted pulp and comminuting the freeze dried pulp.

2. The method of claim 1 wherein a gum in the amount of 0.1 to 4% by weight of the wet pulp is added to the pulp prior to drying.

3. The method of claim 1 or 2 wherein a dextrin, having a D.E. of less than 20, in the amount of 0.5 to 20% by weight of the wet pulp is added to the pulp prior to drying.

4. The method of claim 1 wherein the basic material contains monovalent or divalent metal ions.

5. The method of claim 1 wherein the pH is increased by washing the pulp with water and thereafter adding a water soluble, edible, inorganic basic material.

6. The method according to claim 1 or 5 wherein the pulp is dried to below 10% moisture.

7. The freeze dried pulp produced in accordance with the method of claim 1 or 5.

8. A powdered beverage mix containing the pulp of claim 7 in an amount which will effect a pulp level in a reconstituted beverage of from 0.02 to 1.0 grams per quart.

* * * * *